(12) United States Patent
Prasad

(10) Patent No.: US 11,665,576 B2
(45) Date of Patent: May 30, 2023

(54) SYSTEMS AND METHODS FOR WIRELESS LOW LATENCY TRAFFIC SCHEDULER

(71) Applicant: Verizon Patent and Licensing Inc., Arlington, VA (US)

(72) Inventor: Abhinav Prasad, Edison, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 17 days.

(21) Appl. No.: 16/100,913

(22) Filed: Aug. 10, 2018

(65) Prior Publication Data
US 2020/0053591 A1 Feb. 13, 2020

(51) Int. Cl.
| | | |
|---|---|---|
| H04W 28/02 | (2009.01) | |
| H04L 65/80 | (2022.01) | |
| H04N 21/238 | (2011.01) | |
| H04N 21/262 | (2011.01) | |
| H04W 28/20 | (2009.01) | |
| H04B 17/309 | (2015.01) | |
| G06N 20/00 | (2019.01) | |
| H04L 65/70 | (2022.01) | |

(52) U.S. Cl.
CPC ........ *H04W 28/0268* (2013.01); *G06N 20/00* (2019.01); *H04B 17/309* (2015.01); *H04L 65/70* (2022.05); *H04L 65/80* (2013.01); *H04N 21/238* (2013.01); *H04N 21/26216* (2013.01); *H04W 28/0247* (2013.01); *H04W 28/20* (2013.01)

(58) Field of Classification Search
CPC . H04W 28/0268; H04W 28/02; H04W 28/16; H04W 28/0231; H04W 65/80; H04W 28/0247; H04W 28/20; H04W 28/00; H04W 72/1226; H04W 72/08; H04W 28/0236; H04B 17/309; H04B 17/30; H04B 17/373; G06N 20/00; G06N 3/0454; G06N 3/0445; H04L 65/607; H04L 65/80; H04L 1/0017; H04L 1/0018; H04L 1/0016; H04L 1/0015; H04L 65/4084; H04N 21/238; H04N 21/262; H04N 21/26216; H04N 21/2385; H04N 21/2402
USPC ......................................................... 370/235
See application file for complete search history.

(56) References Cited

U.S. PATENT DOCUMENTS

| | | | |
|---|---|---|---|
| 6,347,217 B1 * | 2/2002 | Bengtsson | ............ H04W 24/00 370/333 |
| 9,584,966 B1 * | 2/2017 | Thiel | ..................... G01S 5/0252 |
| 2005/0054359 A1 * | 3/2005 | Ishii | ...................... H04W 72/08 455/513 |
| 2010/0248643 A1 * | 9/2010 | Aaron | ................... H04L 1/0002 455/68 |

(Continued)

*Primary Examiner* — Sudesh M Patidar

(57) ABSTRACT

A base station device may include a memory configured to store instructions and a processor configured to execute the instructions to obtain one or more radio signal quality parameter values associated with a user equipment (UE) device and determine a channel quality class associated with the UE device based on the obtained one or more radio signal quality parameter values using a machine learning model. The processor may be further configured to identify an application data stream associated with the UE device, select an application bandwidth for the application data stream based on the determined channel quality class, and send application data associated with the application data stream to the UE device based on the selected application bandwidth.

20 Claims, 10 Drawing Sheets

(56) References Cited

U.S. PATENT DOCUMENTS

| | | | |
|---|---|---|---|
| 2012/0051299 A1* | 3/2012 | Thakolsri | H04W 28/22 |
| | | | 370/329 |
| 2013/0237227 A1* | 9/2013 | Nagaraja | H04W 16/10 |
| | | | 455/436 |
| 2014/0293955 A1* | 10/2014 | Keerthi | H04L 5/006 |
| | | | 370/330 |
| 2015/0195216 A1* | 7/2015 | Di Pietro | H04L 47/365 |
| | | | 370/252 |
| 2016/0140956 A1* | 5/2016 | Yu | G10L 15/16 |
| | | | 704/240 |
| 2016/0226703 A1* | 8/2016 | Grinshpun | H04W 24/08 |
| 2016/0286427 A1* | 9/2016 | Chakraborty | G06F 9/30043 |
| 2017/0041213 A1* | 2/2017 | Nadalin | H04L 45/22 |
| 2018/0054248 A1* | 2/2018 | Kahtava | H04W 28/0268 |
| 2018/0302892 A1* | 10/2018 | Ökvist | H04B 17/318 |
| 2018/0367844 A1* | 12/2018 | Fu | H04N 21/44004 |
| 2019/0044824 A1* | 2/2019 | Yadav | H04W 24/04 |
| 2019/0253902 A1* | 8/2019 | Dhanapal | H04W 36/0007 |
| 2019/0268240 A1* | 8/2019 | Yadav | H04L 41/16 |
| 2019/0334794 A1* | 10/2019 | Halepovic | H04L 43/026 |
| 2021/0044995 A1* | 2/2021 | Cirkic | G06K 9/00536 |
| 2021/0068097 A1* | 3/2021 | Pedersen | H04L 1/0009 |

* cited by examiner

SYSTEMS AND METHODS FOR WIRELESS LOW LATENCY TRAFFIC SCHEDULER

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. The provider may manage a large number of wireless access networks and a particular wireless access network may manage a large number of devices. In order to maintain a quality of service across a network, or across multiple networks, the provider may need to manage the flow of data to wireless communication devices.

DETAILED DESCRIPTION OF PREFERRED EMBODIMENTS

Figure 1:
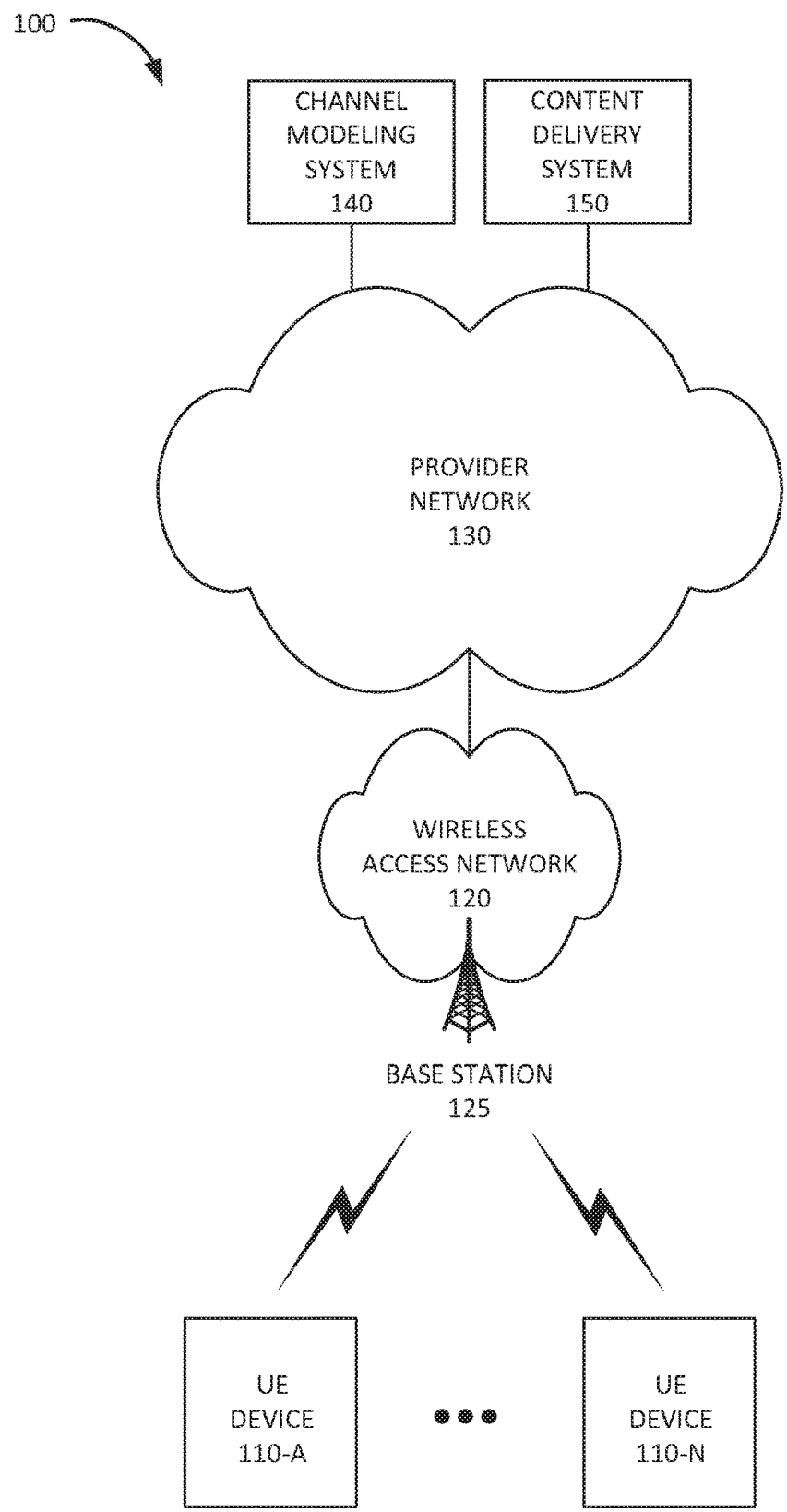
FIG. 1 is a diagram illustrating an environment according to an implementation described herein.

The following detailed description refers to the accompanying drawings. The same reference numbers in different drawings identify the same or similar elements.

As the data traffic and number of user equipment (UE) devices using wireless access networks increase, the number of different types of UE devices and the number of different types of data also increase. For example, Fourth Generation (4G) and/or Fifth Generation (5G) wireless networks may provide low latency and large bandwidth aggregation wireless communication and be designed so that processing functionality is located closer to an antenna system and further away from a core network. Such a design may separate functionality and protocol layers well, but may not always enable efficient scheduling of traffic at an application layer.

The capacity of a wireless access network may be limited by the air interface between a base station and user equipment (UE) devices communicating with the base station using wireless signals. The air interface may experience interference from multipath fading and/or multipath symbol interference from buildings or other structures, foliage, vehicles, atmospheric conditions, and/or other sources of scattering, reflection, or absorption of radio signals; interference from other base stations; interference from other UE devices; and/or other causes. The interference may vary with time and may significantly impact key performance indicators (KPIs) of user experience, such as, for example, latency, delay, and/or jitter. However, management of KPIs at an application layer, such as in a video streaming application, may not take into account network effects resulting from interference at the air interface.

As an example, a video streaming application may manage quality by retransmission of packets at the Internet Protocol (IP) layer. Thus, if a packet that includes video content is not successfully delivered to a recipient because of interference at the air interface, the video streaming application may retransmit the packet. Such retransmissions may further reduce the efficiency of the air interface. As another example, video streaming techniques, such as Motion Picture Experts Group (MPEG), High Efficiency Video Coding (HEVC), and/or Dynamic Adaptive Streaming over Hypertext Transfer Protocol (HTTP) (DASH) techniques, may adapt to degraded network conditions. For example, an MPEG-DASH technique may break up a video content file into small HTTP-based file segments and each segment may be made available at a number of different bit rates. The client media player application may select different bit rates for different segments based on current network conditions. However, the client media player application may be not be able to adapt fast enough to changing air interface conditions.

Implementations described herein relate to systems and method for a wireless low latency traffic scheduler that learns and adapts to radio channel conditions. The traffic scheduler may, in conjunction with a physical layer scheduler, schedule application layer traffic to be transmitted over the air interface to a UE device based on radio channel conditions associated with the UE device. A physical layer scheduler at a base station may schedule downlink (DL) media access control (MAC) protocol data units (PDUs) over physical resources of the air interface. The size of the PDUs may depend primarily on the channel conditions as reported by a UE device through a Channel Quality Indicator (CQI) value and/or other types of values that measure channel quality. The channel quality reported in the CQI value may be based on a signal to noise ratio (SNR) and may vary over time. The accuracy of CQI may be defined such that a receiver can expect a transport block size (TBS) that is can decode with at least a 90% success rate or 10% block error rate (BLER).

Once the data is transmitted to a UE device over the physical radio resources, the base station may receive an acknowledgement (ACK) or negative ACK (NACK) from the UE device over an uplink (UL) control channel. A channel estimation block may collect a time series data that includes radio signal quality parameter values such as, for example, SNR, a signal-to-interference-plus-noise ratio (SINR), Received Signal Strength Indication (RSSI), Reference Signal Received Quality (RSRQ), Reference Signal Received Power (RSRP), and/or other types of radio signal quality parameter values. The physical layer may further collect time series data that includes radio signal quality parameter values such as, for example, CQI, BLER, channel coding metrics, throughput, and/or other types of radio signal quality parameter values.

The radio signal quality parameter values may be used to estimate a channel quality class for the channel associated with a UE device and the channel quality class may be used to select an application bandwidth for sending application data to the UE device. The channel quality class may be determined based on one or more radio signal quality parameter values using one or more machine learning (ML) models. Thus, a computer device associated with a base station, may be configured to obtain one or more radio signal quality parameter values associated with a UE device and determine a channel quality class associated with the UE device based on the obtained one or more radio signal quality parameter values using a machine learning model. The computer device may further be configured to identify an application data stream associated with the UE device, select an application bandwidth for the application data stream based on the determined channel quality class, and send application data associated with the application data stream to the UE device based on the selected application bandwidth. Selecting the application bandwidth may include, for example, selecting at least one of a resolution, bandwidth, or encoding quality for a video stream associated with the application data stream.

Selecting an application bandwidth based on a determined channel quality class enables a traffic scheduler to adapt to changing radio channel conditions, resulting in more efficient delivery of application data over the air interface. For example, sending application data wirelessly to a UE device using a low application bandwidth when a UE device is experiencing poor channel quality may result in a decrease in the number of retransmissions of application data packets that would result if the application data were to be sent using a high application bandwidth. Fewer retransmissions may result in less use of the air interface and a lower latency for applications with a low latency requirement, such as video playback applications. Thus, selecting an application bandwidth based on a determined channel quality class conserves wireless network resources and improves user experience.

The machine learning model may be selected from a set of machine learning models (e.g., a logistic regression classifier, a linear discriminant analysis (LDA) classifier, a quadratic linear discriminant analysis (QDA) classifier, a decision tree classifier, a naïve Bayes classifier, a K-nearest neighbors classifier, a support vector machine (SVM) classifier, tree based (e.g., a random forest) classifier using Euclidian and/or cosine distance methods, a maximum entropy classifier, a kernel density estimation classifier, a principal component analysis (PCA) classifier, an artificial neural network classifier, etc.) based on one or more performance metrics with respect to determining channel quality classes for UE devices. For example, a confusion matrix may be used to keep track of accuracy, predictive values, sensitivity, specificity, and/or other types of performance metrics for particular ones of the set of machine learning models. In some implementations, the one or more radio signal quality parameter values may include a time series of radio signal quality parameter values and determining the channel quality class associated with the UE device may include predicting the channel quality class based on the time series of radio signal quality parameter values. For example, the machine learning model may include a recurrent neural network trained to predict the channel quality class based on the time series of radio signal quality parameter values.

Moreover, the computer device may be further configured to obtain one or more application performance parameter values associated with the UE device and determining the channel quality class associated with the UE device using the machine learning model may be further based on the obtained one or more application performance parameter values. The one or more application performance parameters may include one or more of a time to video start value, a rebuffering time value, an average bit rate value, a maximum bit rate value, a playback error rate value, a video latency value, a lag ratio value, and/or another type of application performance parameter.

Additionally, in some implementations, the one or more application performance parameter values may include a time series of application performance parameter values and determining the channel quality class associated with the UE device may include predicting the channel quality class based on the time series of application performance parameter values.

In some implementations, the computer device may be configured to obtain location information associated with the UE device and determining the channel quality class associated with the UE device using the machine learning model may be further based on the obtained location information. For example, the computer device may determine, based on the obtained location information, that channel quality class information for a location associated with the UE device has not been determined and may use a machine learning model trained based on data that associates channel quality classes with particular locations to determine the channel quality class for the location associated with the UE device.

FIG. 1 is a diagram of an exemplary environment 100 in which the systems and/or methods, described herein, may be implemented. As shown in FIG. 1, environment 100 may include UE devices 110-A to 110-N (referred to collectively as "UE devices 110" and individually as "UE device 110"), a wireless access network 120, a provider network 130, a channel modeling system 140, and a content delivery system 150.

UE device 110 may include a handheld wireless communication device (e.g., a mobile phone, a smart phone, etc.); a laptop computer, a tablet computer, or another type of portable computer; a desktop computer device; a wearable computer device (e.g., a head-mounted display computer device, a head-mounted camera device, a wristwatch computer device, etc.), a global positioning system (GPS) device; a media playing device; a portable gaming system; and/or any other type of computer device with wireless communication capabilities. UE device 110 may be used for voice communication, mobile broadband services (e.g., video streaming, real-time gaming, premium Internet access etc.), best effort data traffic, and/or other types of applications.

In other implementations, UE device 110 may include an embedded wireless Internet of Things (IoT) device that communicates wirelessly with other devices over a machine-to-machine (M2M) interface, such as a Machine Type Communication (MTC) interface and/or another type of M2M interface. For example, UE device 110 may be electrically coupled to any electronic device with a microcontroller, such as a microcontroller controlling one or more actuators, a microcontroller controlling one or more sensors, a microcontroller that performs data processing, and/or another type of electronic device with a microcontroller. Examples of such devices may include a parking or road sensor (e.g., a magnetic vehicle detector, a motion sensor, a force or load sensor, a vibration sensor, etc.), a utility meter or monitor (e.g., an electricity sensor, a water sensor, a gas sensor, etc.), a weather sensor (e.g., a temperature sensor, a humidity sensor, a barometric pressure sensor, a wind sensor, a light sensor, etc.), a smart city sensor (e.g., a building vibration sensor, a noise level sensor, an electromagnetic field sensor, a traffic congestion level sensor, a traffic light sensor, a lighting level sensor, a waste container fill level sensor, an air pollution level sensor, etc.), a device associated with a security system (e.g., a camera, a motion sensor, a door sensor, a window sensor, etc.), a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a power system (e.g., a smart grid monitoring device, etc.), a device controlling a financial transaction system (e.g., a point-of-sale terminal, a vending machine, etc.), and/or another type of electronic device.

In yet other implementations, UE device 110 may correspond to an unmanned aerial vehicle or an unmanned aircraft system that communicates wirelessly with other devices over an M2M interface using MTC and/or another type of M2M communication. Examples of such airborne MTC devices include consumer drone devices used for entertainment, photo or video capture, payload delivery, and/or other uses; commercial delivery drones used to deliver packages to customers; law enforcement drones used for intelligence gathering operations; and/or other types of drones, aerostats, or other aerial devices.

Wireless access network 120 may provide access to provider network 140 for wireless devices, such as UE devices 110 via a base station 125. While FIG. 1 illustrates a single base station 125 for illustrative purposes, in practice, wireless access network 120 may include multiple, and possibly a large number of, base stations 125. Wireless access network 120 may enable UE devices 110 to connect to provider network 140 for mobile telephone service, video and/or audio downloads or streaming, live gaming, Short Message Service (SMS) message service, Multimedia Message Service (MMS) message service, Internet access, cloud computing, and/or other types of data services. Wireless access network 120 may establish a packet data network connection between UE device 110 and provider network 140 using one or more Access Point Names (APNs). For example, wireless access network 120 may establish an Internet Protocol (IP) connection between UE device 110 and provider network 140.

In some implementations, wireless access network 120 may include a Long Term Evolution (LTE) access network (e.g., an evolved packet core (EPC) network). In other implementations, wireless access network 120 may include a Code Division Multiple Access (CDMA) access network. For example, the CDMA access network may include a CDMA enhanced High Rate Packet Data (eHRPD) network (which may provide access to an LTE access network).

Furthermore, wireless access network 120 may include an LTE Advanced (LTE-A) access network and/or a Fifth Generation (5G) access network or other advanced network that includes 5G New Radio (NR) air interface functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality. Base station 125 may include and/or be associated with one or more cells that include devices and/or components configured to enable wireless communication with UE devices 110. For example, each cell may include and/or be associated with a radio frequency (RF) transceiver facing a particular direction.

Provider network 140 may include, or be coupled/connected to, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of such networks. Provider network 140 may allow the delivery of Internet Protocol (IP) services to UE devices 110, and may interface with other external networks. Provider network 140 may include one or more server devices and/or network devices, or other types of computation or communication devices. In some implementations, provider network 140 may include an Internet Protocol Multimedia Sub-system (IMS) network (not shown in FIG. 1). An IMS network may include a network for delivering IP multimedia services and may provide media flows between UE device 110 and external IP networks or external circuit-switched networks (not shown in FIG. 1). Provider network 140 may connect to, or include, channel modeling system 140 and content delivery system 150.

Channel modeling system 140 may include one or more devices, such as computer devices, network devices, and/or server devices, which manage machine learning models used to predict a channel quality class for UE devices 110 associated with base station 125. For example, channel modeling system 140 may train different types of machine learning models to determine a channel quality class based on a set of parameters, to predict a channel quality class based on a time series of one or more parameters, to determine the channel quality class for a particular location based on channel quality classes associated with other locations, and/or train machine learning models for other types of classification tasks related to determining channel quality classes. Channel modeling system 140 may select a particular machine learning model from a set of machine learning models based on one or more criteria, such as criteria determined using a confusion matrix. Channel modeling system 140 may provide a trained machine learning model to base station 125 and/or may enable base station 125 to access a trained machine learning model to determine channel quality classes for UE devices 110 associated with base station 125.

Content delivery system 150 may include one or more devices, such as computer devices, network devices, and/or server devices, which provide content to UE devices 110. As an example, content delivery system 150 may provide video content to UE device 110 via streaming and/or download. As another example, content delivery system 150 may provide audio content (e.g., songs, audiobooks, etc.), may provide application content (e.g., mobile applications, software updates, games, etc.), may provide cloud storage services, may provide a catalog of retail items and/or other types of products or services, and/or may provide other types of content. Some or all of the content available via content delivery system 150 may be stored in a cache associated with base station 125. The cache of base station 125 may provide the cached content to UE devices 110 at a faster speed upon request compared to retrieving the content from content delivery system 150, thereby improving user experience and conserving network resources.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
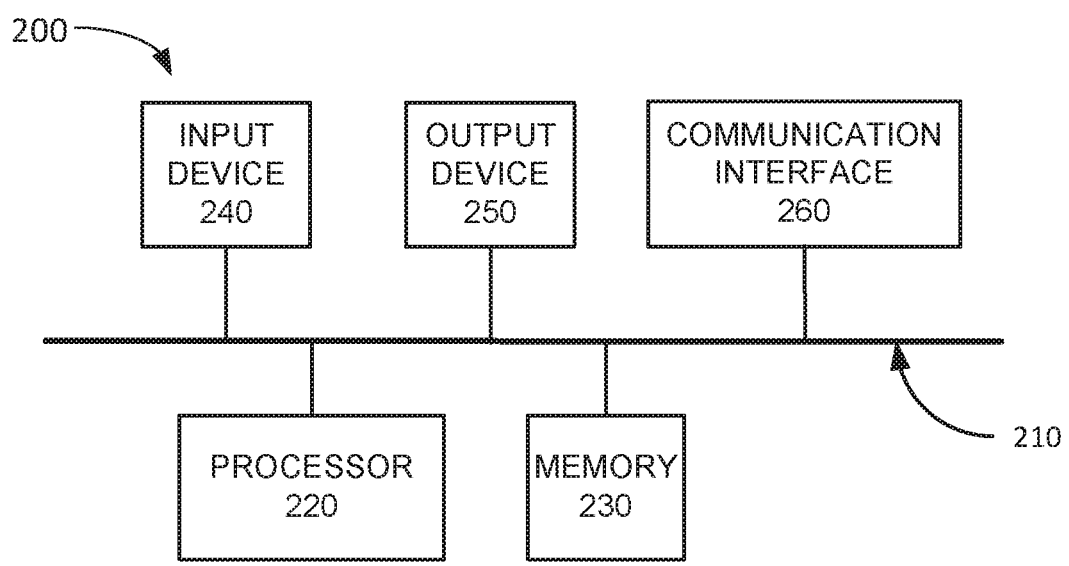
FIG. 2 is a diagram illustrating exemplary components of a device that may be included in a device or system of FIG. 1.

FIG. 2 is a diagram illustrating example components of a device 200 according to an implementation described herein. UE device 110, base station 125, channel modeling system 140, and/or content delivery system 150 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to managing an application bandwidth based on a determined channel quality class. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
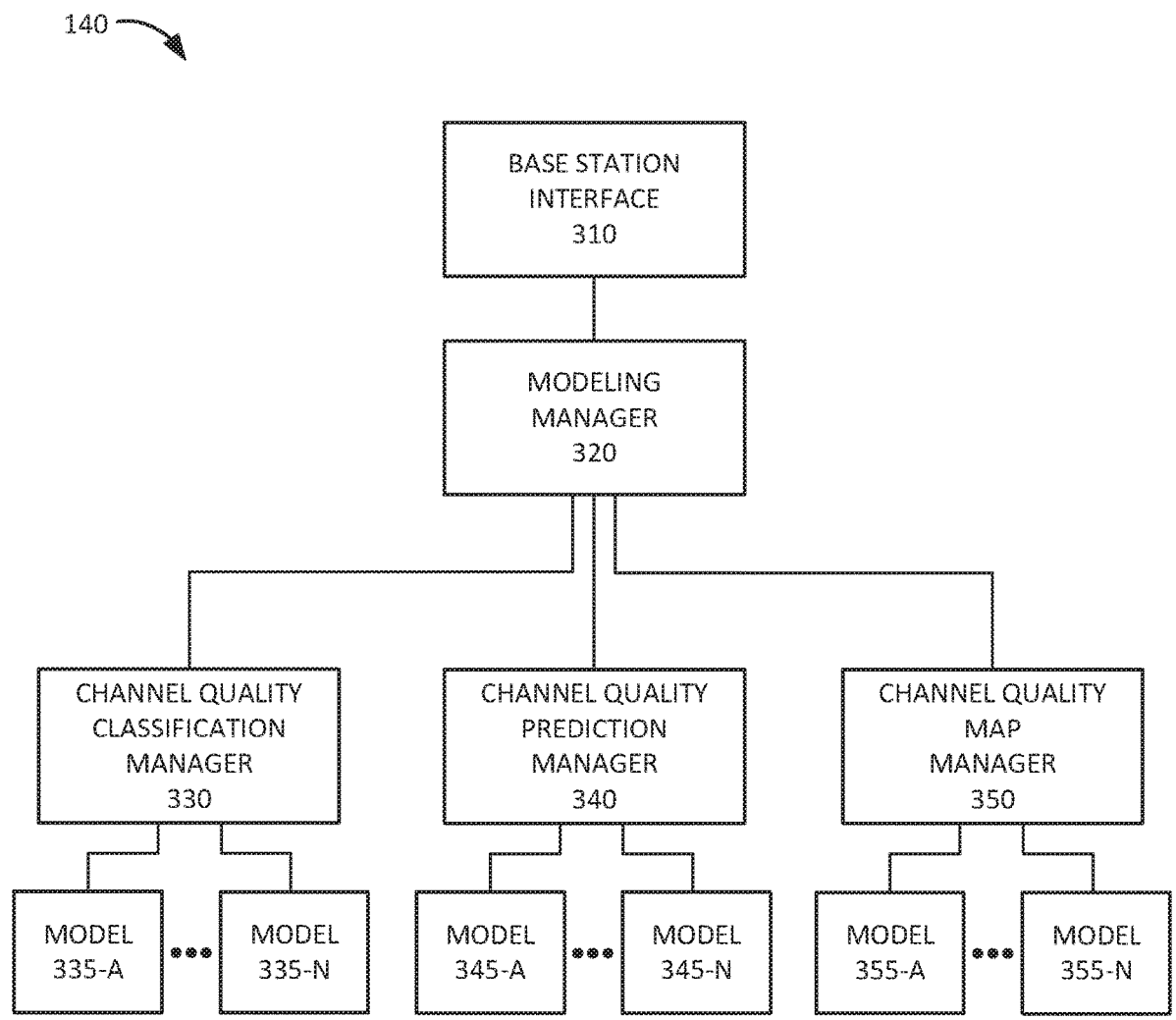
FIG. 3 is a diagram illustrating exemplary functional components of the channel modeling system of FIG. 1.

FIG. 3 is a diagram illustrating exemplary functional components of channel modeling system 140. The functional components of channel modeling system 140 may be implemented, for example, via processor 220 executing instructions from memory 230. Alternatively, some or all of the functional components included in channel modeling system 140 may be implemented via hard-wired circuitry. As shown in FIG. 3, channel modeling system 140 may include a base station interface 310, a modeling manager 320, a channel quality classification manager 330, a channel quality prediction manager 340, and a channel quality map manager 350.

Base station interface 310 may be configured to communicate with base station 125. As an example, base station interface 310 may provide one or more trained machine learning models to base station 125 and/or may update a particular machine learning model used by base station 125. As another example, base station interface 310 may obtain data (e.g., locations of UE devices 110, radio signal quality parameters, application performance parameters, etc.) from base station 125 to train and/or update a particular machine learning model. As yet another example, base station interface 310 may enable base station 125 to access a particular machine learning model to determine a channel quality class associated with a particular UE device 110 serviced by base station 125.

Modeling manager 320 may manage machine learning models associated with channel modeling system 140. For example, modeling manager 320 may select a particular machine learning model for a particular situation, such as a particular base station 125, a particular set of parameters, a particular location, a particular time period, and/or other types of criteria, situation, and/or condition. Modeling manager 320 may further manage training and/or updating of particular machine learning models. Modeling manager 320 may manage channel quality classification manager 330, channel quality prediction manager 340, and/or channel quality map manager 350.

Channel quality classification manager 330 may manage one or more models 335-A to 335-N trained to determine a channel quality class based on one or more parameters, such as, for example, radio signal quality parameters and/or application performance parameters. Each model 335 may correspond to a particular machine learning model, classifier, and/or algorithm. For example, model 335 may correspond to a logistic regression classifier, a linear discriminant analysis classifier, a decision tree classifier, a naïve Bayes classifier, a K-nearest neighbors classifier, a SVM classifier, a random forest classifier, a maximum entropy classifier, a kernel density estimation classifier, an artificial neural network classifier, and/or another type of machine learning model, classifier, and/or algorithm. Furthermore, different models 335 may be associated with a same type of model, classifier, and/or algorithm, but be associated with different input parameters, associated with different output classes, trained with different training sets, trained with different hyperparameters, associated with a different accuracy, and/or associated with a different resource use requirement. Each model 335 may take as input one or more radio signal quality parameter values and/or application performance parameter values and may output a channel quality class. Channel quality classification manager 330 may maintain a confusion matrix for each model 335 that keeps track of accuracy, predictive values, sensitivity, specificity, precision, and/or other classification performance parameters. Channel quality classification manager 330 may select a particular model 335 based on the confusion matrix associated with the particular model 335.

Channel quality prediction manager 340 may manage one or more models 345-A to 345-N trained to predict a channel quality class based on one or more time series of a parameter, such as, for example, time series of radio signal quality parameters and/or time series of application performance parameters. Each model 345 may correspond to a particular machine learning model, classifier, and/or algorithm. For example, model 345 may correspond to a recurrent neural network (RNN), such as a Long Short Term Memory (LSTM) neural network, an attention mechanism neural network, a Gated Recurrent Units (GRU) neural network, an independently recurrent neural network (IndRNN), a Neural Turing Machine (NTM), and/or another type of neural network. Channel quality prediction manager 340 may take as input one or more time series of radio signal quality parameters and/or application performance parameters and may output a predicted channel quality class for a future time period. Channel quality prediction manager 340 may maintain a confusion matrix for each model 345 that keeps track of accuracy, predictive values, sensitivity, specificity, precision, and/or other classification performance parameters. Channel quality prediction manager 340 may select a particular model 345 based on the confusion matrix associated with the particular model 345.

Channel quality map manager 350 may manage one or more models 355-A to 355-N trained to determine a channel quality class for a particular location, associated with a particular UE device 110, based on determined channel quality classes for other locations. Each model 355 may correspond to a particular machine learning model, classifier, and/or algorithm. For example, model 355 may correspond to a convolutional neural network (CNN), a self-organizing map (SOM) neural network, and/or another type of machine learning model, classifier, and/or algorithm. Channel quality map manager 350 may take as input one or more locations and associated channel quality classes and may output a channel quality class for another location and/or a channel quality class for a set of locations. Channel quality map manager 350 may maintain a confusion matrix for each model 355 that keeps track of accuracy, predictive values, sensitivity, specificity, precision, and/or other rates. Channel quality map manager 350 may select a particular model 355 based on the confusion matrix associated with the particular model 345.

Although FIG. 3 shows exemplary components of channel modeling system 140, in other implementations, channel modeling system 140 may include fewer components, different components, additional components, or differently arranged components than depicted in FIG. 3. Additionally or alternatively, one or more components of channel modeling system 140 may perform one or more tasks described as being performed by one or more other components of channel modeling system 140. For example, in some implementations, some or all of the functionality of channel modeling system 140 may be implemented by base station 125.

Figure 4:
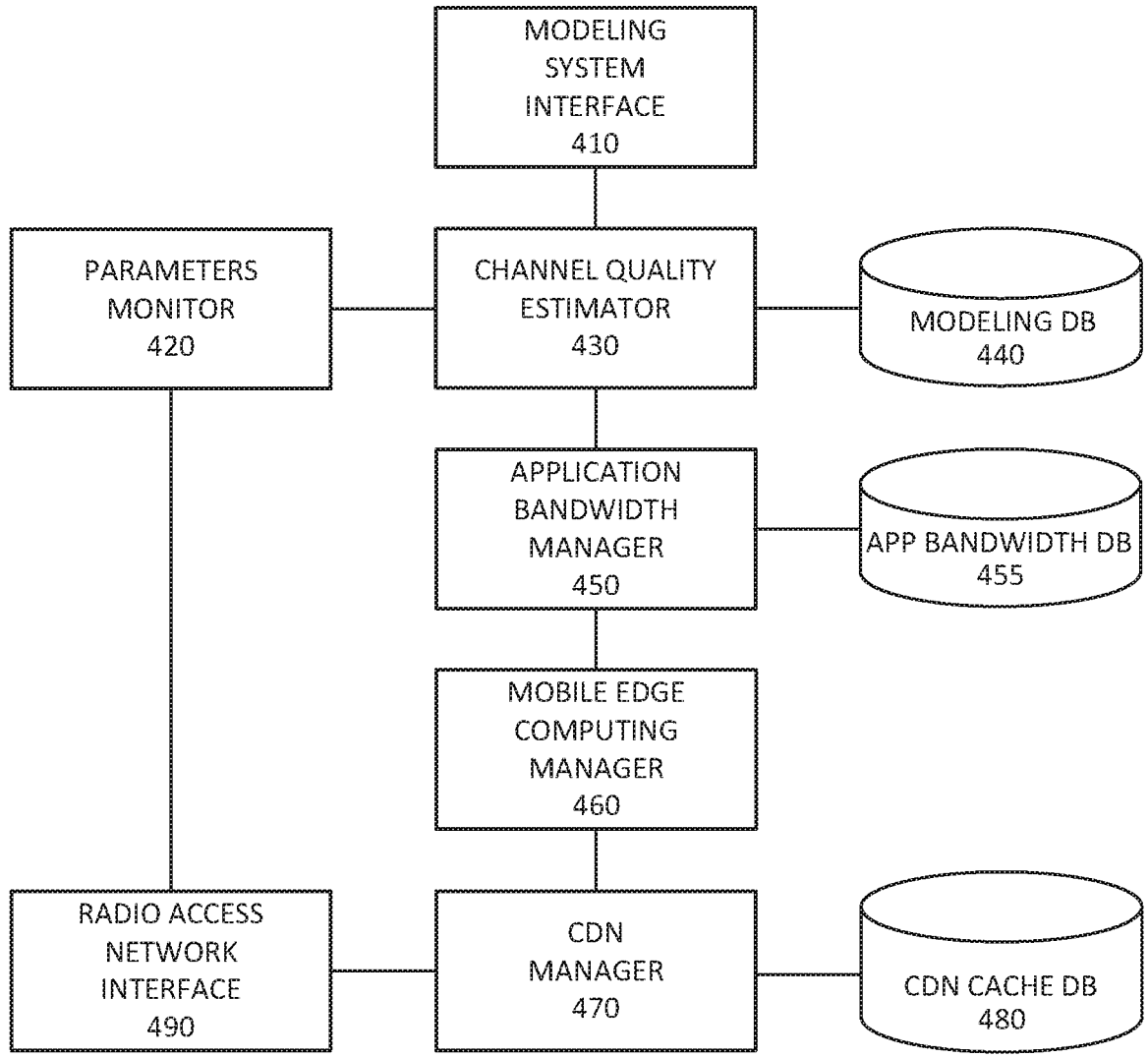
FIG. 4 is a diagram illustrating exemplary functional components of the base station of FIG. 1.

FIG. 4 is a diagram illustrating exemplary functional components of base station 125. The functional components of base station 125 may be implemented, for example, via processor 220 executing instructions from memory 230. Alternatively, some or all of the functional components included in base station 125 may be implemented via hard-wired circuitry. As shown in FIG. 4, base station 125 may include a modeling system interface 410, a parameters monitor 420, a channel quality estimator 430, a modeling database (DB) 440, an application bandwidth manager 450, an application (app) bandwidth DB 455, a mobile edge computing manager 460, a content delivery network (CDN) manager 470, a CDN cache DB 480, and a radio access network interface 490.

Modeling system interface 410 may be configured to communicate with channel modeling system 140. As an example, modeling system interface 410 may provide information to channel modeling system 140 to train a machine learning model, such as radio signal quality parameters and/or application performance parameters associated with a particular UE device 110 at a particular location. As another example, modeling system interface 410 may obtain a trained machine learning model, and/or updates for the trained machine learning model, from channel modeling system 140 and store the trained machine learning model in modeling DB 440.

Parameters monitor 420 may monitor parameters associated with UE devices 110. For example, parameters monitor 420 may monitor one or more radio signal quality parameters associated with a particular UE device 110, such as, for example, CQI, SNR, SINR, BLER, RSSI, RSRQ, RSRP, a throughput value, and/or another indication of radio signal quality. Radio signal quality parameter values, associated with a particular UE device 110, may be reported by the particular UE device 110 to base station 125 via radio access network interface 490. Furthermore, parameters monitor 420 may monitor one or more application performance parameters associated with the particular UE device 110, such as, for example, a time to video start, a rebuffering time, an average bit rate, a maximum bit rate, a playback error rate, a video latency, a lag ratio, and/or another performance parameter associated with an application. The application performance parameters may be obtained from the application running on the particular UE device 110, from a server device (e.g., content delivery system 150) associated with the application, and/or from CDN manager 470 associated with the application.

Channel quality estimator 430 may estimate the channel quality for a particular UE device 110 using information collected by parameters monitor 420 and using one or more machine learning models. The machine learning models may use information stored in modeling DB 440 and/or make decisions based on communication with channel modeling system 140. Modeling DB 440 may store information relating to one or more trained machine learning models. Exemplary information that may be stored in modeling DB 440 is described below with reference to FIG. 5. For example, channel quality estimator 430 may determine the channel quality based on input parameters that include one or more radio signal quality parameter values, one or more application performance parameter values, and/or the location of UE device 110, by accessing modeling DB 440 to identify a channel quality class associated with the input parameters. If channel quality estimator 430 does not identify an entry in modeling DB 440 for the input parameters, channel quality estimator 430 may request a determination of the channel quality class from channel modeling system 140 by sending the input parameters to channel modeling system 140.

Application bandwidth manager 450 may manage an application bandwidth for an application data stream associated with a particular UE device 110, based on a channel quality class determined by channel quality estimator 430 and based on information stored in application bandwidth DB 455. Application bandwidth DB 455 may store, for particular applications, information relating particular channel quality classes to particular application bandwidths. For example, for each application, application bandwidth DB 455 may store a table that relates particular channel quality classes to particular application bandwidth settings and/or other types of application settings that may be applied to an application data stream. For example, the application bandwidth may specify a particular representation to select in an MPEG-DASH Media Presentation Description (MPD) for a video file, such as a particular resolution, frame rate, bandwidth, codec, sampling rate, and/or another type of parameter.

Mobile edge computing manager 460 may manage mobile edge computing functions associated with base station 125. Mobile edge computing manager 460 may extend cloud computing functionality to base station 125 by running application and processes closer to UE device 110 in order to improve performance, reduce processing times, and/or conserve network resources. Mobile edge computing manager 460 may perform video delivery optimization by selecting an application bandwidth for a video application based on instructions received from application bandwidth manager 450. Mobile edge computing manager 460 may perform other functions related to mobile edge computing, such as coordinating local communication between IoT devices connected to base station 125, facilitating ultra-reliable low latency communication for critical communication for medical applications, autonomous vehicles, etc., and/or perform other types of mobile edge computing functions.

CDN manager 470 may manage content stored in CDN cache DB 480. CND cache DB 480 may store cached content associated with content delivery system 150. CDN manager 470 may receive new content from content delivery system 150 and store the new content in CND cache DB 480.

Furthermore, CDN manager 470 may include an application layer traffic scheduler that provides cached content from CDN cache DB 480 to UE device 110 in response to UE device 110 requesting content stored in CDN cache DB 480. The application layer traffic scheduler may work in conjunction with a physical layer scheduler in radio access network interface 490. Radio access network interface 490 may implement an air interface for wirelessly communicating with UE devices 110. For example, radio access network interface 490 may manage one or more wireless RF transceivers associated with base station 125.

Although FIG. 4 shows exemplary components of base station 125, in other implementations, base station 125 may include fewer components, different components, additional components, or differently arranged components than depicted in FIG. 4. Additionally or alternatively, one or more components of base station 125 may perform one or more tasks described as being performed by one or more other components of base station 125.

Figure 5:
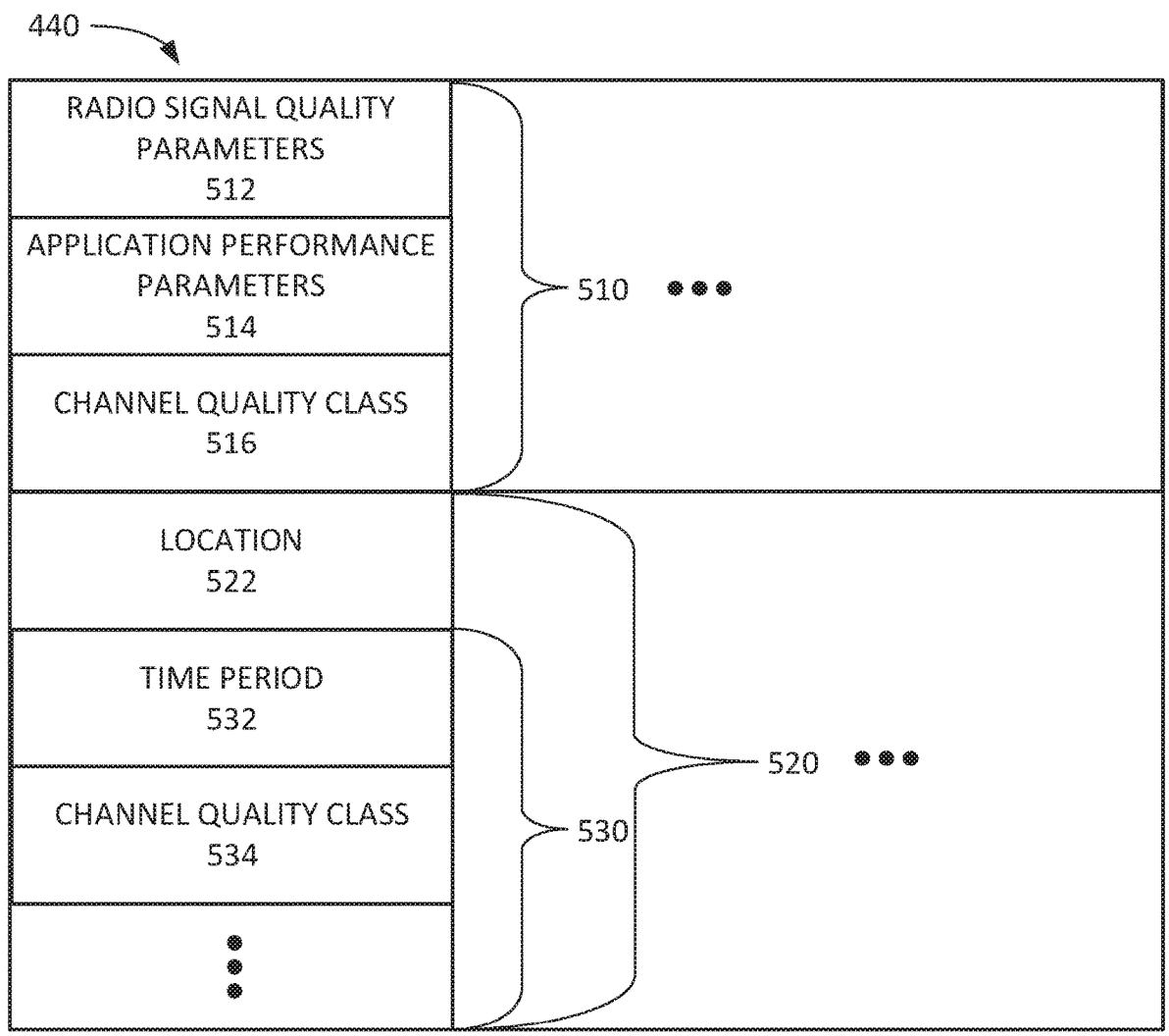
FIG. 5 is a diagram illustrating exemplary components of the modeling database of FIG. 4.

FIG. 5 is a diagram illustrating exemplary components of modeling DB 440. As shown in FIG. 5, modeling DB 440 may include one or more channel quality class records 510 and one or more channel quality prediction records 520. Each channel quality class record 510 may store information relating to a particular channel quality class. Channel quality class record 510 may include a radio signal quality parameters field 512, an application performance parameters field 514, and a channel quality class field 516. Radio signal quality parameters field 512 may store one or more radio signal quality parameter values associated with the particular channel quality class. Application performance parameters field 514 may store one or more application performance parameter values associated with the particular channel quality class.

Channel quality class field 516 may identify the particular channel quality class. As an example, channel quality class field 516 may identify a good channel quality class or a poor channel quality class. As yet another example, channel quality class field 516 may identify a channel quality class on a scale of channel quality classes from a highest channel quality to a lowest channel quality. As yet another example, channel quality class field 516 may identify a channel quality class based on the environment and/or types of users associated with base station 125. Thus, channel quality class field 516 may identify a channel quality class based on a user density, user speed, and/or whether a user is indoors or outdoors. For example, channel quality class field 516 may identify the channel quality class as an indoor hotspot channel quality class, as a dense urban channel quality class, as an urban macro channel quality class, as a rural channel quality class, as a high speed (e.g., vehicular speed, etc.) channel quality class, as a pedestrian channel quality class, as a mass transit channel quality class (e.g., a WiFi access point on a bus, train, plane, etc.), as an aerial drone channel quality class, and/or as another type of channel quality class.

Each channel quality prediction record 520 may store information relating to a particular channel quality class prediction. Channel quality prediction record 520 may include a location field 522 and one or more time period records 530. Location field 522 may identify a particular UE device 110 location. Time period record 530 may store channel quality class prediction information relating to a particular time period. Time period record 530 may include a time period field 532 and a channel quality class field 534. Time period field 532 may identify a particular time period, such a particular time of day, a particular day of the week, a particular time of the month, a particular time of the year, a time period associated with a particular calendar event, and/or another type of time period. Channel quality class field 534 may store information identifying a predicted channel quality class for the particular time period at the particular location.

Although FIG. 5 shows exemplary components of modeling DB 440, in other implementations, modeling DB 440 may include fewer components, different components, additional components, or differently arranged components than depicted in FIG. 5.

Figure 6:
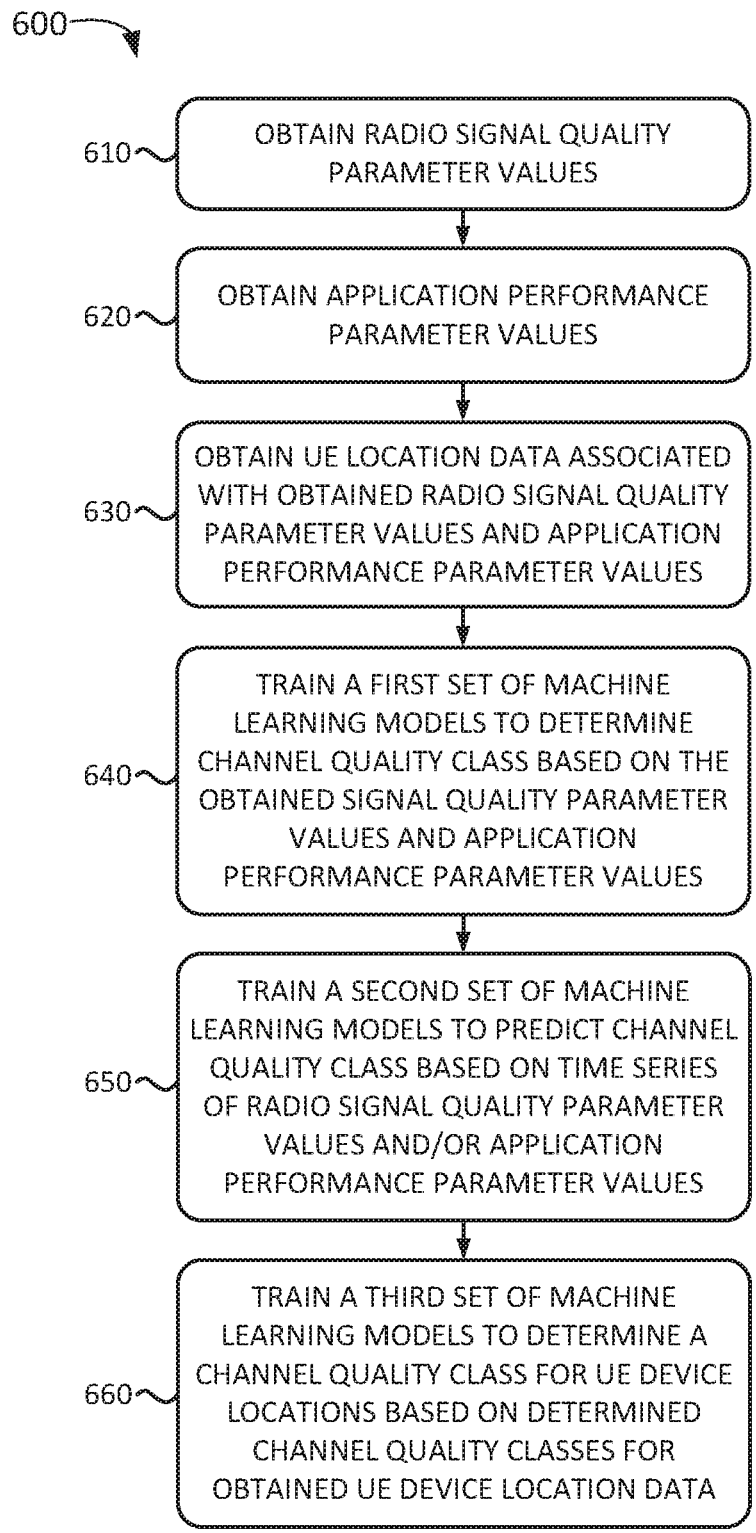
FIG. 6 is a flowchart of a process for training machine learning models according to an implementation described herein.

FIG. 6 is a flowchart 600 of a process for training machine learning models according to an implementation described herein. In some implementations, the process of FIG. 6 may be performed by channel modeling system 140. In other implementations, some or all of the process of FIG. 6 may be performed by another device or a group of devices separate from channel modeling system 140, such as, for example, base station 125.

The process of FIG. 6 may include obtaining radio signal quality parameter values (block 610), obtaining application performance parameter values (block 620), and obtaining location data associated with the obtained radio signal quality parameter values and application performance parameter values (block 630). For example, modeling manager 320 of channel modeling system 140 may generate one or more training sets to train a particular machine learning model. A training set may be based on a set of radio signal quality parameter values, application performance parameter values, and/or UE device 110 location data obtained from a set of base stations 125. A training set may be based on standards based channel models and/or based on a live network scenario in which data is collected and a channel quality class manually determined by an operator.

For some machine learning models, such as, for example, an SVM model, a logistic regression model, a naïve Bayes model, a k-nearest neighbor model, a decision tree model, and/or some neural network models, the training may be supervised and each training set input vector may be paired with a labeled output (e.g., a labeled channel quality class). For other machine learning models, such as, for example, clustering models and/or neural network models, the training may be unsupervised and the training set may not be labeled with known outputs during training. Furthermore, some training sets may include a time series of radio signal quality parameter values and/or application performance parameter values.

The process of FIG. 6 may include training a first set of machine learning models to determine a channel quality class based on the obtained radio signal quality parameter values and/or application performance parameter values (block 640). For example, modeling manager 320 may instruct channel quality classification manager 330 to train models 335-A to 335-N using one or more training sets as a logistic regression classifier, a linear discriminant analysis classifier, a decision tree classifier, a naïve Bayes classifier, a K-nearest neighbors classifier, an SVM classifier, a random forest classifier, a maximum entropy classifier, a kernel density estimation classifier, an artificial neural network classifier, and/or another type of machine learning model, classifier, and/or algorithm to determine a channel quality class based on a set of radio signal quality parameter values and/or application performance parameter values.

The process of FIG. 6 may further include training a second set of machine learning models to predict a channel quality class based on a time series of radio signal quality parameter values and/or application performance parameter values (block 650). For example, modeling manager 320 may instruct channel quality prediction manager 340 to train models 345-A to 345-N using one or more training sets that include a time series of radio signal quality parameter values and/or application performance parameter values, to predict a future channel quality class based on a changing pattern of radio signal quality parameter values and/or application performance parameter values.

The process of FIG. 6 may further include training a third set of machine learning models to determine a channel quality class for UE device 110 locations based on determined channel quality classes for the obtained UE device 110 location data (block 660). For example, modeling manager 320 may instruct channel quality map manager 350 to train models 355-A to 355-N using one or more training sets that associate location data with particular radio signal quality parameter values and/or application performance parameter values, and/or with channel quality classes determined for the particular radio signal quality parameter values and/or application performance parameter values, to determine a channel quality class for a particular location based on channel quality classes determined for other locations.

Figure 7:
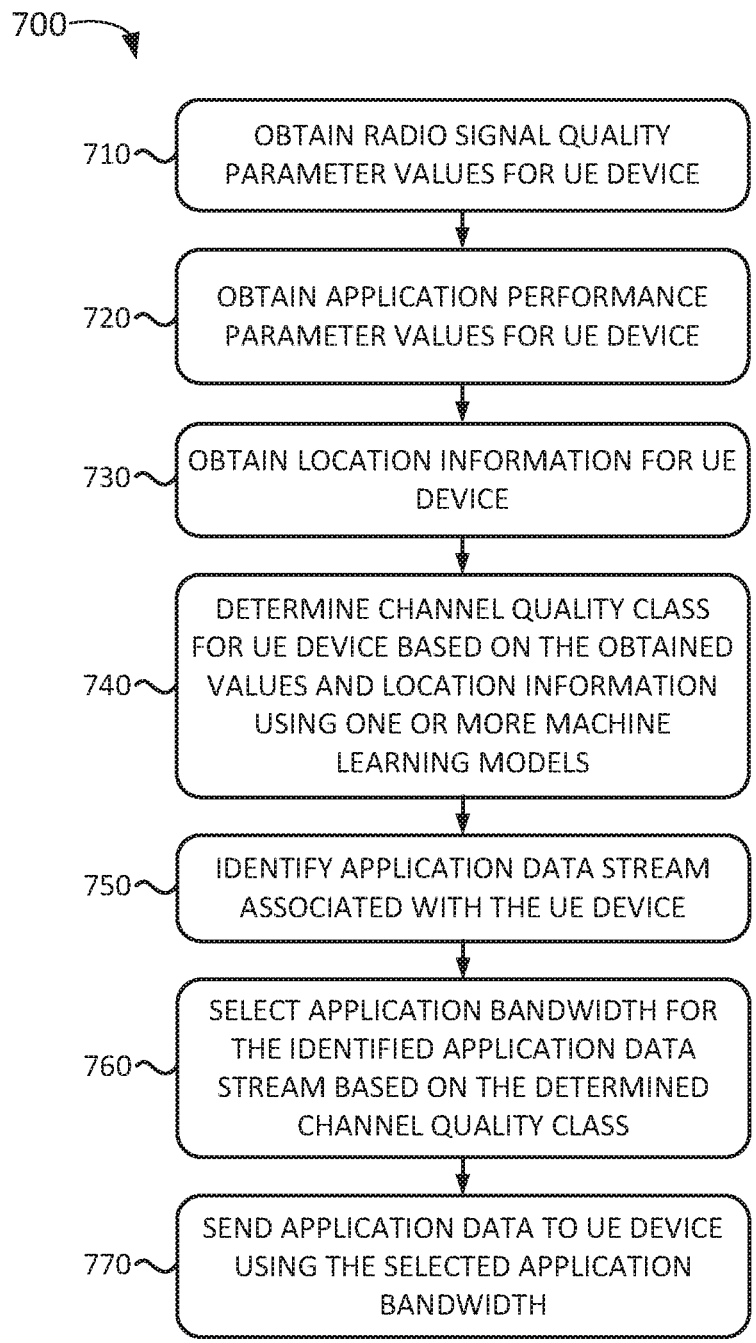
FIG. 7 is a flowchart of a process for selecting an application bandwidth based on a channel quality class according to an implementation described herein.

FIG. 7 is a flowchart 700 of a process for selecting an application bandwidth based on a channel quality class according to an implementation described herein. In some implementations, the process of FIG. 7 may be performed by base station 125. In other implementations, some or all of the process of FIG. 7 may be performed by another device or a group of devices separate from base station 125.

The process of FIG. 7 may include obtaining radio signal quality parameter values for UE device 110 (block 710). For example, parameters monitor 420 may obtain, via radio access network interface 490, one or more radio signal quality parameters associated with a particular UE device 110, such as, for example, CQI, SNR, SINR, BLER, RSSI, RSRQ, RSRP, a throughput value, and/or another indication of radio signal quality. Application performance parameter values may be obtained for UE device 110 (block 720). For example, parameters monitor 420 may obtain application performance parameters, such as one or more of a time to video start, a rebuffering time, an average bit rate, a maximum bit rate, a playback error rate, a video latency, a lag ratio, and/or another performance parameter, from the application running on the particular UE device 110 (e.g., a video playing application, etc.) and/or from CDN manager 470 in communication with the application (e.g., an application session managed by CDN manager 470 and associated with the particular UE device 110). Location information for UE device 110 may be obtained (block 730). For example, radio access network interface 490 may determine the location of UE device 110 based on GPS information, multilateration information, and/or other types of location information.

A channel quality class for UE device 110 may be determined based on the obtained values using one or more machine learning models (block 740). In some implementations, channel quality estimator 430 may determine a channel quality class based on the obtained radio signal quality parameter values and/or application performance parameter values by using a trained machine learning model obtained from channel modeling system 140. The trained machine learning model (e.g., a K-nearest neighbors model, etc.) may output a current channel quality class for UE device 110. In some implementations, the outputted current channel quality class may correspond to binary selection between a good channel quality class or a poor channel quality class. In other implementations, the outputted current channel quality class may correspond to a selection from a set of channel quality classes from a lowest channel quality class to a highest channel quality class.

In yet other implementations, the outputted current channel quality class may identify the environment and/or types of users associated with base station 125, such as, for example, user density, user speed, and/or whether a user is indoors or outdoors. As an example, the channel quality class may be selected from a set that includes an indoor hotspot channel quality class, as dense urban channel quality class, an urban macro channel quality class, a rural channel quality class, a high speed channel quality class, a pedestrian channel quality class, and/or a mass transit channel quality class.

The current channel quality class may be determined for UE devices 110 at particular intervals and/or in response to particular trigger events, such as the activation of an application session. In some implementations, rather than determining channel quality classes for particular UE devices 110, base station 125 may determine a channel quality class for a group of UE devices 110. As an example, base station 125 may determine a channel quality class for a particular geographic area (e.g., based on all the UE devices 110 within the particular geographic area). The geographic area may be based on a sector associated with base station 125, based on an annulus centered on the location of base station 125, based on an area bounded by one or more structures (e.g., a building, a road, etc.), based on an area defined by a division of a hierarchical geographic grid, and/or based on another definition of a geographic area.

As another example, base station 125 may determine a channel quality class for a group of UE devices 110 using a particular wireless band, a group of UE devices 110 associated with a particular application performance parameter value (e.g., a particular playback error rate, video latency, time to video start, etc.), a group of UE devices 110 associated with an active application session for a particular application, and/or another type of grouping of UE devices 110.

Additionally or alternatively, channel quality estimator 430 may predict a channel quality class for a particular time period based on a time series of signal quality parameter values and/or application performance parameter values and a machine learning model trained to predict a future channel quality class. For example, the machine learning model may predict a channel quality class for a future time period, such as a particular time of day, a particular day of the week, a particular time of the month, a particular time of the year, a time period associated with a particular calendar event, and/or another type of time period. In some implementations, the channel quality class may be predicted for a group of UE devices, such as a group of UE devices 110 associated with a particular geographic area, using a particular wireless band, associated with a particular application performance parameter value, associated with an active application session for a particular application, and/or another type of grouping of UE devices 110.

The predicted channel quality class may be used to anticipate application bandwidth to be selected for an upcoming time period and may enable base station 125 to plan the use of air interface resources. For example, an application layer scheduler associated with CDN manager 470 may be able to, in coordination with a physical scheduler associated with radio access network interface 490, more efficiently schedule PDUs that include application data.

Additionally or alternatively, channel quality estimator 430 may use a machine learning model, such as a CNN, a SOM, and/or another type of machine learning model that conserves spatial information, to determine a channel quality class for a location based on channel quality classes determined for other locations. Thus, the machine learning model may be used to create a map of channel quality classes for an area serviced by base station 125. The map may be used to estimate or predict a channel quality class for a location for which a channel quality class has not been previously determined. The map may be used, for example, to anticipate a channel quality class, and thus an application bandwidth, for a UE device 110 moving in a particular direction.

An application data stream associated with UE device 110 may be identified (block 750); an application bandwidth for the identified application data stream may be selected based on the determined channel quality class (block 760); and application data may be sent to UE device 110 using the selected application bandwidth (block 770). For example, application bandwidth manager 450 may access application bandwidth DB 455 to identify an application bandwidth associated with the determined channel quality class. CDN manager 470 may provide the application data (e.g., video content segments, audio content segments, software updates, etc.) to radio access network interface 490 using the selected application bandwidth and radio access network interface 490 may use a physical scheduler to schedule wireless transmission of the application data to UE device 110.

Figure 8:
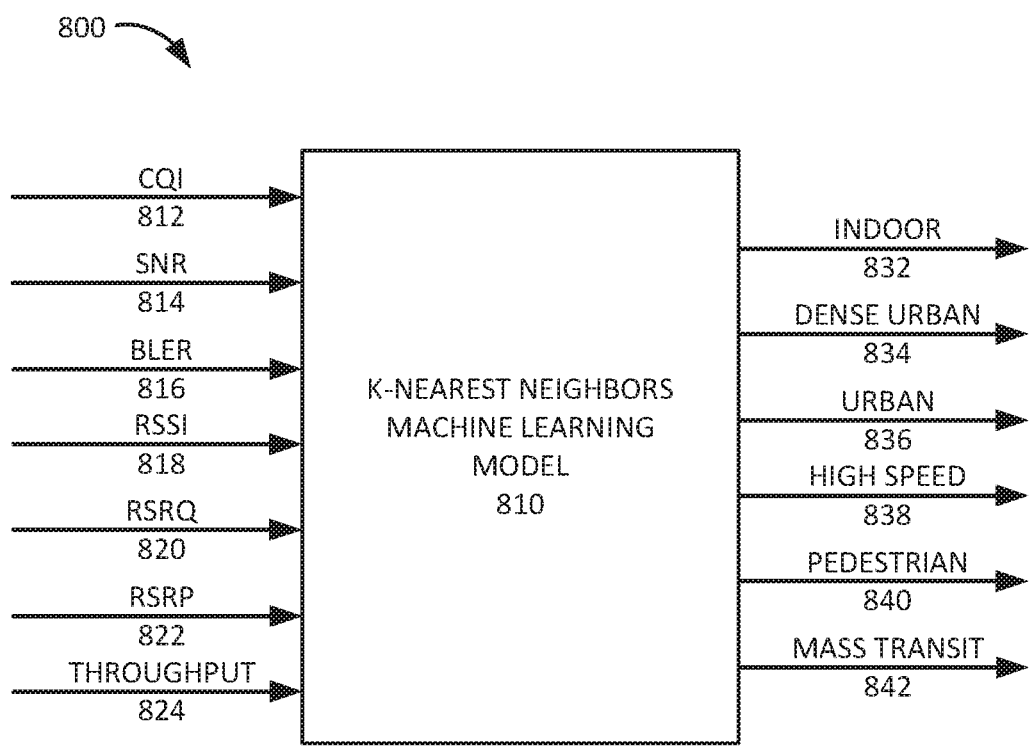
FIG. 8 is a diagram of a first exemplary machine learning model.

FIG. 8 is a diagram of a first exemplary machine learning model 800. As shown in FIG. 8, machine learning model 800 may include a K-nearest neighbors model 810 that includes seven signal inputs and classifies a particular combination of values for the seven signal inputs into one of six channel quality classes. The inputs may include a CQI value 812, an SNR value 814, a BLER value 816, an RSSI value 818, an RSRQ value 820, an RSRP value 822, and a throughput value 824. K-nearest neighbors model 810 may be trained to classify a set of input values into one of the six channel quality classes, which may include an indoor channel quality class 832, a dense urban channel quality class 834, an urban channel quality class 836, a high speed channel quality class 838, a pedestrian channel quality class 840, or a mass transit channel quality class 842. The determined channel quality class for a set of input values associated with a particular UE device 110 may be used to select an application bandwidth for the particular UE device 110.

While FIG. 8 illustrates a K-nearest neighbors ML model, in other implementations, a different type of ML model may be used, such as, for example, a logistic regression classifier, an LDA classifier, a QDA classifier, a decision tree classifier, a naïve Bayes classifier, a K-nearest neighbors classifier, an SVM classifier, a random forest classifier, a maximum entropy classifier, a kernel density estimation classifier, a PCA classifier, a neural network classifier, and/or another type of ML model.

Figure 9:
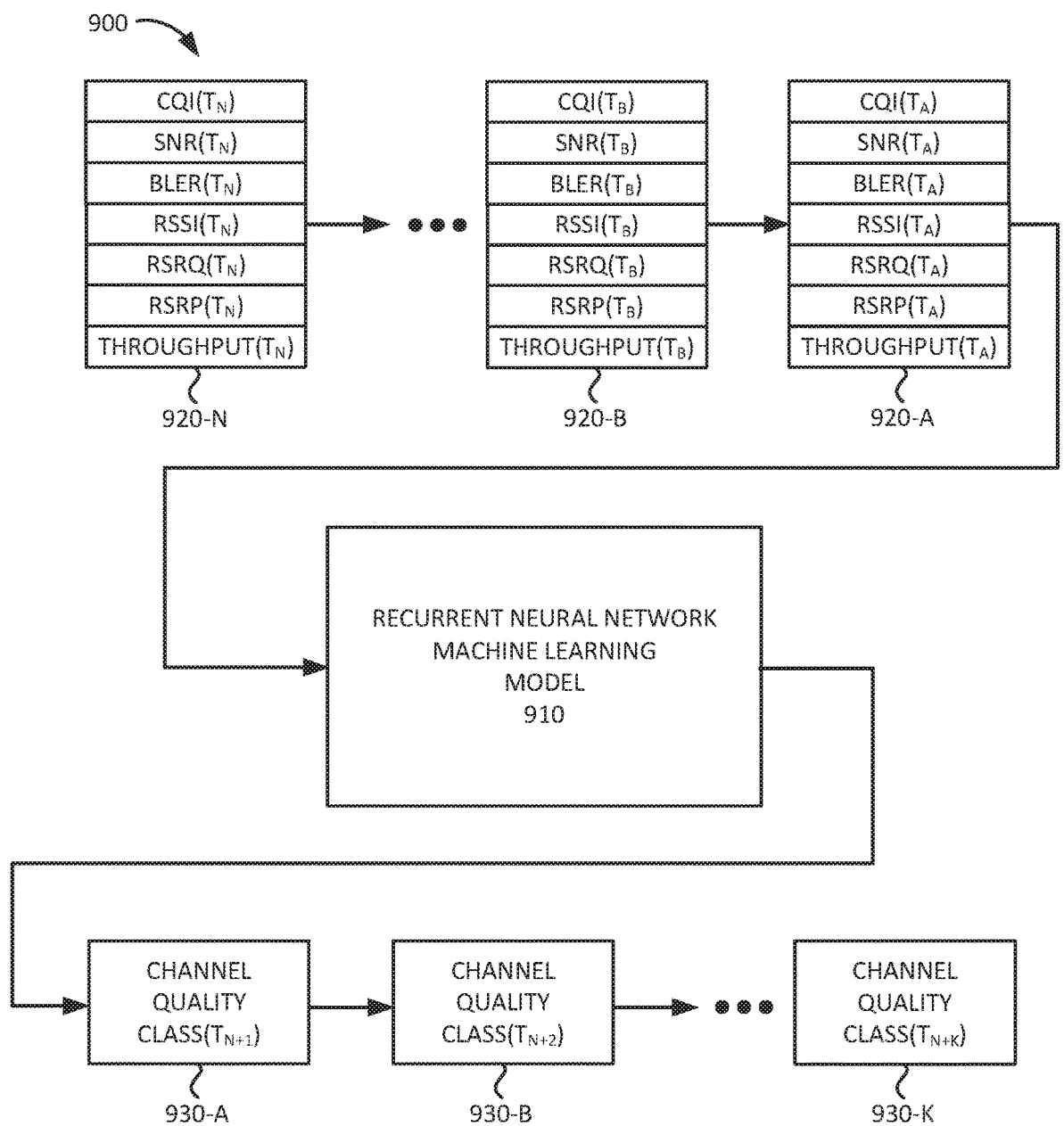
FIG. 9 is a diagram of a second exemplary machine learning model.

FIG. 9 is a diagram of a second exemplary machine learning model 900. As shown in FIG. 9, machine learning model 900 may include an RNN ML model 910. RNN ML model 910 may include an LSTM neural network, an attention mechanism neural network, a GRU neural network, an IndRNN, an NTM, and/or another type of neural network configured to process time series information.

The inputs to RNN ML model 910 may include a time series of value sets 920-A to 920-N of radio signal quality parameter values. Each value set 920 may include each of a CQI value, an SNR value, a BLER value, an RSSI value, an RSRQ value, an RSRP value, and a throughput value measured at a particular time period from time periods $T_A$ to $T_N$. RNN ML model 910 may output a predicted time series of channel quality classes 930- to 930-K for time periods $T_{N+1}$ to $T_{N+K}$. The predicted channel quality classes for time periods associated with a particular UE device 110 $T_{N+1}$ to $T_{N+K}$ may be used to select an application bandwidth for the particular UE device 110 for the time periods $T_{N+1}$ to $T_{N+K}$.

In yet other implementations, another type of ML model may be used. For example, model 355 may include a CNN model configured to determine a channel quality class based on image and/or video data. For example, the CNN may analyze images and/or videos sent via the air interface (e.g., video teleconference data sent by UE device 110, photos or videos being uploaded by UE device 110, etc.) to determine whether any degradation of the image and/or video data occurred over the air interface and determine a channel quality class based on the determination. Thus, the CNN may be trained to map a set of images to a channel quality class.

In yet other implementations, an RNN model based on STM, GRU, or another type of RNN neural network may determine a channel class based on accuracy of text and/or quality of speech. For example, channel quality estimator 430 may be configured to convert speech in audio data (e.g., telephone call audio, etc.) to text and to determine the accuracy of the text to words and/or sentence structure in the spoken language and/or to determine the quality of the speech based on a quality of speech measure, such as a 1-5 mean opinion score (MOS). The channel quality class may then be determined based on the MOS score. Thus, the RNN model may be trained to map speech-to-text data to a channel quality class.

Figure 10:
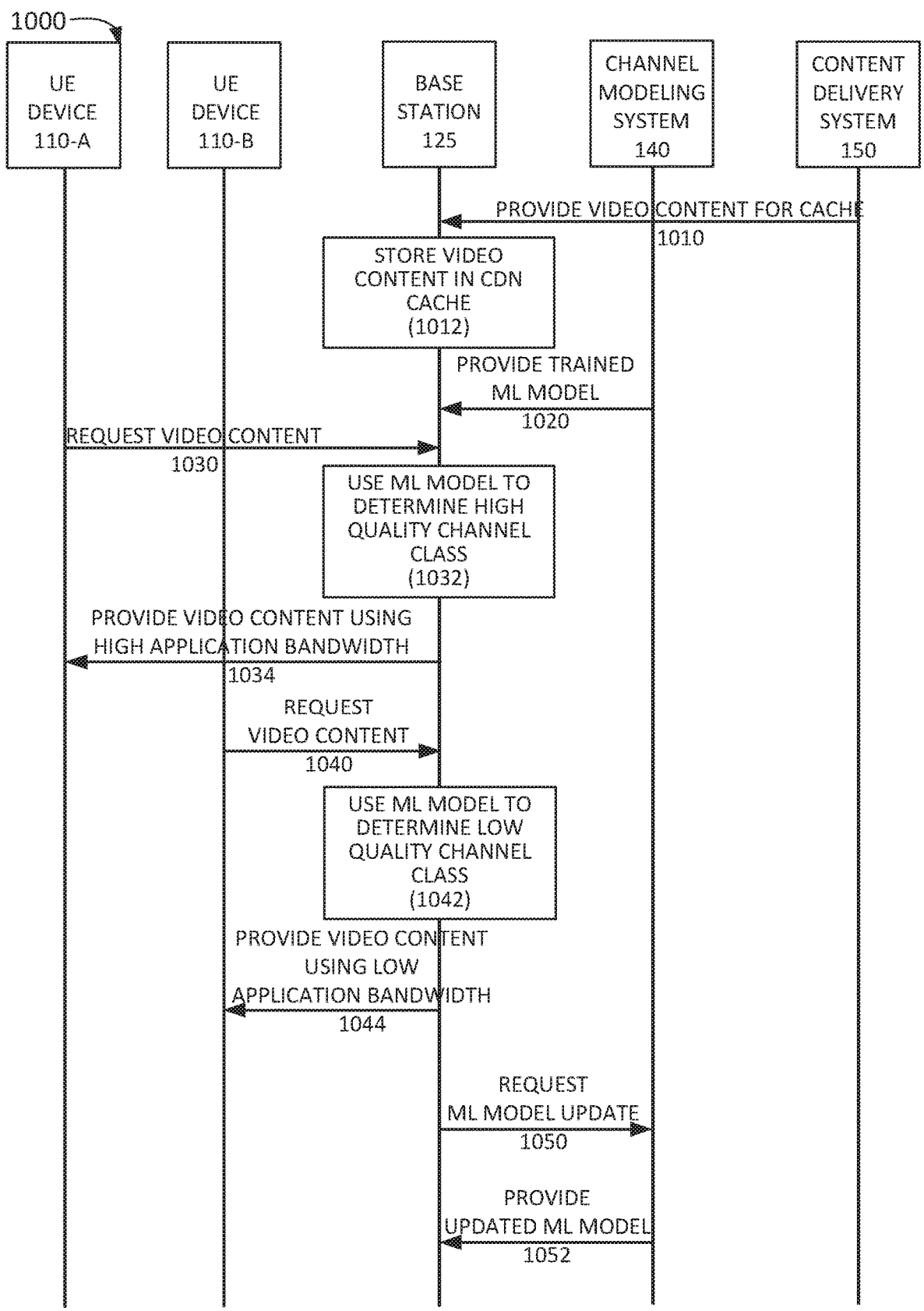
FIG. 10 is a diagram of an exemplary signal flow according to an implementation described herein.

FIG. 10 is a diagram of an exemplary signal flow 1000 according to an implementation described herein. As shown in FIG. 10, signal flow 1000 may include content delivery system 150 providing video content to base station 125 (signal 1010) and base station 125 may store the received video content in CDN cache 480 (block 1012). Furthermore, channel modeling system 140 may provide a trained machine learning (ML) model to base station 125 to determine channel quality classes for UE devices 110 (signal 1020).

Signal flow 1000 may further include UE device 110-A requesting the cached video content (signal 1030). Base station 125 may determine that UE device 110-A is associated with a high channel quality class, using the trained ML model, based on radio signal quality parameters and/or application performance parameters associated with UE device 110-A (block 1032). In response, base station 125 may provide the video content to UE device 110-A using a high application bandwidth (signal 1034). For example, base station 125 may select a high bandwidth MPEG-DASH MPD representation.

At a later time, UE device 110-B may request the cached video content (signal 1040). Base station 125 may determine that UE device 110-B is associated with a low channel quality class, using the trained ML model, based on radio signal quality parameters and/or application performance parameters associated with UE device 110-B (block 1042). In response, base station 125 may provide the video content to UE device 110-B using a low application bandwidth (signal 1044). For example, base station 125 may select a low bandwidth MPEG-DASH MPD representation.

Moreover, base station 125 may send a request to update the ML model to channel modeling system 140 (signal 1050) based on the information obtained from UE device 110-A and/or UE device 110-B and/or the determined channel quality classes for UE device 110-A and 110-B. Channel modeling system 1240 may update the ML model and may provide an updated ML model to base station 125 (signal 1052).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 6 and 7, and a series of signal flows has been described with respect to FIG. 10, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    obtaining, by a computer device associated with a base station, one or more radio signal quality parameter values for a user equipment (UE) device via an interface of the base station that wirelessly communicates with the UE device;
    obtaining, by the computer device, one or more application performance parameter values from the UE device;
    determining, by the computer device, a channel quality class associated with the UE device based on the obtained one or more radio signal quality parameter values and the obtained one or more application performance parameter values using a machine learning model trained to predict the channel quality class from a set of channel quality classes based on one or more radio signal quality parameters and one or more application performance parameters, wherein the set of channel quality classes includes at least one channel quality class that identifies a user density associated with the base station, a least one channel quality class that identifies a user speed associated with the UE device, and at least one channel quality class that identifies whether the UE device is indoors or outdoors;
    identifying, by the computer device, an application data stream associated with the UE device;
    selecting, by the computer device, an application bandwidth for the application data stream based on the determined channel quality class; and
    sending, by the computer device, application data associated with the application data stream to the UE device based on the selected application bandwidth.

2. The method of claim 1, wherein the one or more radio signal quality parameter values include at least one of:
    a channel quality indicator value;
    a signal to noise ratio value;
    a block error rate value;
    a received signal strength indication value;
    a reference signal received quality value;
    a reference signal received power value; or
    a throughput value.

3. The method of claim 1, wherein obtaining the one or more application performance parameter values from the UE device-includes:
    obtaining the one or more application performance parameter values from a video playing application running on the UE device.

4. The method of claim 3, wherein the one or more application performance parameters include at least one of:
    a time to video start value;
    a rebuffering time value;
    an average bit rate value;
    a maximum bit rate value;
    a playback error rate value;
    a video latency value; or
    a lag ratio value.

5. The method of claim 1, further comprising:
    selecting the machine learning model from a plurality of machine learning models based on a performance metric, associated with the plurality of machine learning models, with respect to determining channel quality classes for UE devices.

6. The method of claim 1, wherein the one or more radio signal quality parameter values include a time series of radio signal quality parameter values, and wherein determining the channel quality class associated with the UE device based on the obtained one or more radio signal quality parameter values using a machine learning model includes:
    predicting the channel quality class based on the time series of radio signal quality parameter values.

7. The method of claim 6, further comprising:
    obtaining a time series of application performance parameter values associated with the UE device; and
    wherein predicting the channel quality class based on the time series of radio signal quality parameter values is further based on the obtained time series of application performance parameter values.

8. The method of claim 6, wherein the machine learning model includes a recurrent neural network.

9. The method of claim 1, further comprising:
    obtaining location information associated with the UE device; and
    wherein determining the channel quality class associated with the UE device using the machine learning model is further based on the obtained location information.

10. The method of claim 9, further comprising:
    determining, based on the obtained location information, that channel quality class information for a location associated with the UE device has not been determined; and
    wherein determining the channel quality class associated with the UE device using the machine learning model is further based on the obtained location information includes:
        using a machine learning model trained based on data that associates channel quality classes with particular locations to determine the channel quality class for the location associated with the UE device.

11. The method of claim 1, wherein selecting the application bandwidth for the application data stream based on the determined channel quality class includes:
    selecting at least one of a resolution, bandwidth, or encoding quality for a video stream associated with the application data stream.

12. A base station device comprising:
a memory configured to store instructions; and
a processor configured to execute the instructions to:
    obtain one or more radio signal quality parameter values for a user equipment (UE) device via an interface of the base station device that wirelessly communicates with the UE device;
    obtain one or more application performance parameter values from the UE device;
    determine a channel quality class associated with the UE device based on the obtained one or more radio signal quality parameter values and the obtained one or more application performance parameter values using a machine learning model trained to predict the channel quality class from a set of channel quality classes based on one or more radio signal quality parameters and one or more application performance parameters, wherein the set of channel quality classes includes at least one channel quality class that identifies a user density associated with the base station, a least one channel quality class that identifies a user speed associated with the UE device, and at least one channel quality class that identifies whether the UE device is indoors or outdoors;
    identify an application data stream associated with the UE device;
    select an application bandwidth for the application data stream based on the determined channel quality class; and
    send application data associated with the application data stream to the UE device based on the selected application bandwidth.

13. The base station device of claim 12, wherein the one or more radio signal quality parameter values include at least one of:
    a channel quality indicator value;
    a signal to noise ratio value;
    a block error rate value;
    a received signal strength indication value;
    a reference signal received quality value;
    a reference signal received power value; or
    a throughput value.

14. The base station device of claim 12, wherein, when obtaining the one or more application performance parameter values from the UE device, the processor is further configured to:
    obtain the one or more application performance parameter values from a video playing application running on the UE device.

15. The base station device of claim 14, wherein the one or more application performance parameters include at least one of:
    a time to video start value;
    a rebuffering time value;
    an average bit rate value;
    a maximum bit rate value;
    a playback error rate value;
    a video latency value; or
    a lag ratio value.

16. The base station device of claim 12, wherein the processor is further configured to:
    select the machine learning model from a plurality of machine learning models based on a performance metric, associated with the plurality of machine learning models, with respect to determining channel quality classes for UE devices.

17. The base station device of claim 12, wherein the one or more radio signal quality parameter values include a time series of radio signal quality parameter values, and wherein, when determining the channel quality class associated with the UE device based on the obtained one or more radio signal quality parameter values using a machine learning model, the processor is further configured to:
    predict the channel quality class based on the time series of radio signal quality parameter values.

18. The base station device of claim 17, wherein the processor is further configured to:
    obtain a time series of application performance parameter values associated with the UE device; and
    wherein the processor is further configured to predict the channel quality class based on the obtained time series of application performance parameter values.

19. The base station device of claim 17, wherein the machine learning model includes a recurrent neural network.

20. A non-transitory computer-readable memory device storing instructions executable by a processor, the non-transitory computer-readable memory device comprising:
    one or more instructions to obtain one or more radio signal quality parameter values for a user equipment (UE) device via an interface of a base station that wirelessly communicates with the UE device;
    one or more instructions to obtain one or more application performance parameter values from the UE device;
    one or more instructions to determine a channel quality class associated with the UE device based on the obtained one or more radio signal quality parameter values and the obtained one or more application performance parameter values using a machine learning model trained to predict the channel quality class from a set of channel quality classes based on one or more radio signal quality parameters and one or more application performance parameters, wherein the set of channel quality classes includes at least one channel quality class that identifies a user density associated with the base station, a least one channel quality class that identifies a user speed associated with the UE device, and at least one channel quality class that identifies whether the UE device is indoors or outdoors;
    one or more instructions to identify an application data stream associated with the UE device;
    one or more instructions to select an application bandwidth for the application data stream based on the determined channel quality class; and
    one or more instructions to send application data associated with the application data stream to the UE device based on the selected application bandwidth.

* * * * *